United States Patent [19]

Brüssel

[11] Patent Number: 5,022,839
[45] Date of Patent: Jun. 11, 1991

[54] DEVICE FOR CLEANING A MOLDING TOOL IN PLASTICS PROCESSING MACHINES

[75] Inventor: Richard Brüssel, Sulzfeld, Fed. Rep. of Germany

[73] Assignee: Fried. Krupp GmbH, Essen, Fed. Rep. of Germany

[21] Appl. No.: 426,279

[22] Filed: Oct. 25, 1989

[30] Foreign Application Priority Data

Nov. 3, 1988 [DE] Fed. Rep. of Germany ....... 3837257

[51] Int. Cl.⁵ .................. B29C 45/04; B29C 45/17
[52] U.S. Cl. .................. 425/161; 425/225; 425/228; 425/229; 425/437
[58] Field of Search ............ 425/225, 228, 229, 161, 425/437

[56] References Cited

U.S. PATENT DOCUMENTS

| | | | |
|---|---|---|---|
| 3,941,537 | 3/1916 | Abraham | 425/228 |
| 4,133,621 | 1/1979 | Plocher et al. | 425/126.1 |
| 4,169,299 | 10/1979 | Bandoh | 164/158 |
| 4,726,753 | 2/1988 | Gaigl | 425/225 |
| 4,759,703 | 7/1988 | Krebser et al. | 425/228 |

FOREIGN PATENT DOCUMENTS

| | | | |
|---|---|---|---|
| 3123396 | 1/1983 | Fed. Rep. of Germany . | |
| 2133748 | 4/1983 | Fed. Rep. of Germany . | |
| 3511797 | 5/1986 | Fed. Rep. of Germany | 425/229 |
| 0232873 | 2/1986 | German Democratic Rep. | 425/228 |

Primary Examiner—Willard E. Hoag
Attorney, Agent, or Firm—Spencer & Frank

[57] ABSTRACT

A device for cleaning a molding tool in a plastics processing machine, for example the molding tool of hydraulic presses for pressing molded components from fiber reinforced plastics. The device including a cleaning tool which can be brought to at least one of the surfaces to be cleaned in at least one of a male mold and female mold of the molding tool. In order to be able to perform automatic cleaning of the molding tool in a minimum amount of time and simultaneously avoid the danger of damage to the tool and the machine, the cleaning tool is provided with a holder which is disposed at a carrier of the molding tool, with the movement of the holder being synchronized with the operating stroke of the machine.

10 Claims, 2 Drawing Sheets

DEVICE FOR CLEANING A MOLDING TOOL IN PLASTICS PROCESSING MACHINES

REFERENCE TO RELATED APPLICATIONS

This application claims the priority of Federal Republic of Germany application Serial No. P 38 37 257.6 filed Nov. 3rd, 1988, which is incorporated herein by reference.

BACKGROUND OF THE INVENTION

The present invention relates to a device in a plastics processing machine for cleaning a molding tool thereof, particularly the male and female molds of the molding tool or die of a hydraulic press which presses molded components from fiber reinforced plastics, wherein the device includes at least one cleaning tool which can be moved toward and away from a respective one of the molds.

Die cleaning devices in presses are known in various embodiments. Usually, the dies are cleaned by means of rotating rolls or pivotal brushes. It is also known to clean dies by, for example, moving the brush in guides which are adapted to the outlines of the die.

When plastic components are produced in molding tools which have what is referred to as immersion edges, remainders of burrs remain particularly in the region of the immersion edges. If these burr remainders are not removed, these now hardened pieces of material may be pressed into the next pressed component and may sometimes cause considerable weakening of the resulting press-molded component. Thus, particularly in the case of manual charging of the molding tools, the immersion edges are cleaned manually after each process phase by means of customary cleaning tools, such as compressed air pistols, brushes and scrapers. Such work takes up a considerable amount of time.

It has also been proposed to clean the immersion edges by means of numerically controlled coordinate devices equipped with a brush and a blow nozzle and by traversing a fixed, predetermined geometry. However, this mode of operation requires accurate positioning of the movable press component(s) and molding tools so that they will not be damaged during the cleaning. In this case, cleaning can begin only after the movable molding tool component has come to a standstill in the position of the open stroke. This requires considerably more time and correspondingly delays the next process phase.

SUMMARY OF THE INVENTION

It is therefore an object of the present invention to improve the above-mentioned machine in such a way that the molding tool can be cleaned automatically in the shortest possible time, with the danger of damage to the molding tool and the tool holding components being excluded simultaneously.

This is accomplished by a cleaning device on the plastic molding machine wherein a cleaning tool is mounted to a holder which is movably fastened to a carrier of a molding tool, and movement of the cleaning tool is synchronized with the operating stroke of the machine. Such a device has the particular advantage that, due to the fact that the cleaning tool is fastened directly to a carrier of a molding tool in the machine, a long path otherwise required to bring the cleaning tool to the molding tool component in question is not required.

Additionally, damage to the cleaning device and the molding tool is prevented in that setting members provided at the machine (e.g. at the press slide and at the press table of a hydraulic press) for moving the cleaning tool holder, can easily be used to avoid inadvertent contact between the cleaning device and male and female molds with the aid of appropriate monitoring devices used to determine whether the molds have separated again or not.

Moreover, the solution according to the invention has the advantage that cleaning of the molding tool or die (female and male molds) can begin as soon as the space between the molding tool components, which is enlarged when the machine is opened, is just sufficient to introduce the cleaning device or devices. For this purpose, a further feature of the invention provides that at least part of the holder of a cleaning tool is configured and fastened so as to be pivotal and/or displaceable together with the opening movement of the molding tools.

The present invention is suitable for all plastics processing machines in which a molding tool composed of male and female molds is employed, e.g. injection molding machines and extrusion presses, and particularly for the very popular hydraulic presses, preferably those for processing SMC (sheet molding compound) and IMC (injection molding compound) materials.

With the machine according to the invention, the molding tools can be cleaned by means of known pneumatic or mechanical charging elements such as air nozzles, brushes or scrapers. Combinations of different charging elements, particularly alternatingly arranged air nozzles and brushes can be employed. The intended interchangeable arrangement of charging elements in their holders makes it of course also possible, if required, to easily interchange various charging elements or combinations thereof. The interchangeability also makes it possible to make a selection according to the size and shape of the molding tools and according to the adhesion, hardness, elasticity and flexibility characteristics of the material deposited, particularly, in the region of the immersion edges.

BRIEF DESCRIPTION OF THE DRAWINGS

These and other aspects of the invention will be more completely understood from the following detailed description of the preferred embodiment with reference to the accompanying drawing figures in which.

DETAILED DESCRIPTION OF THE PREFERRED EMBODIMENT

Figure 1:
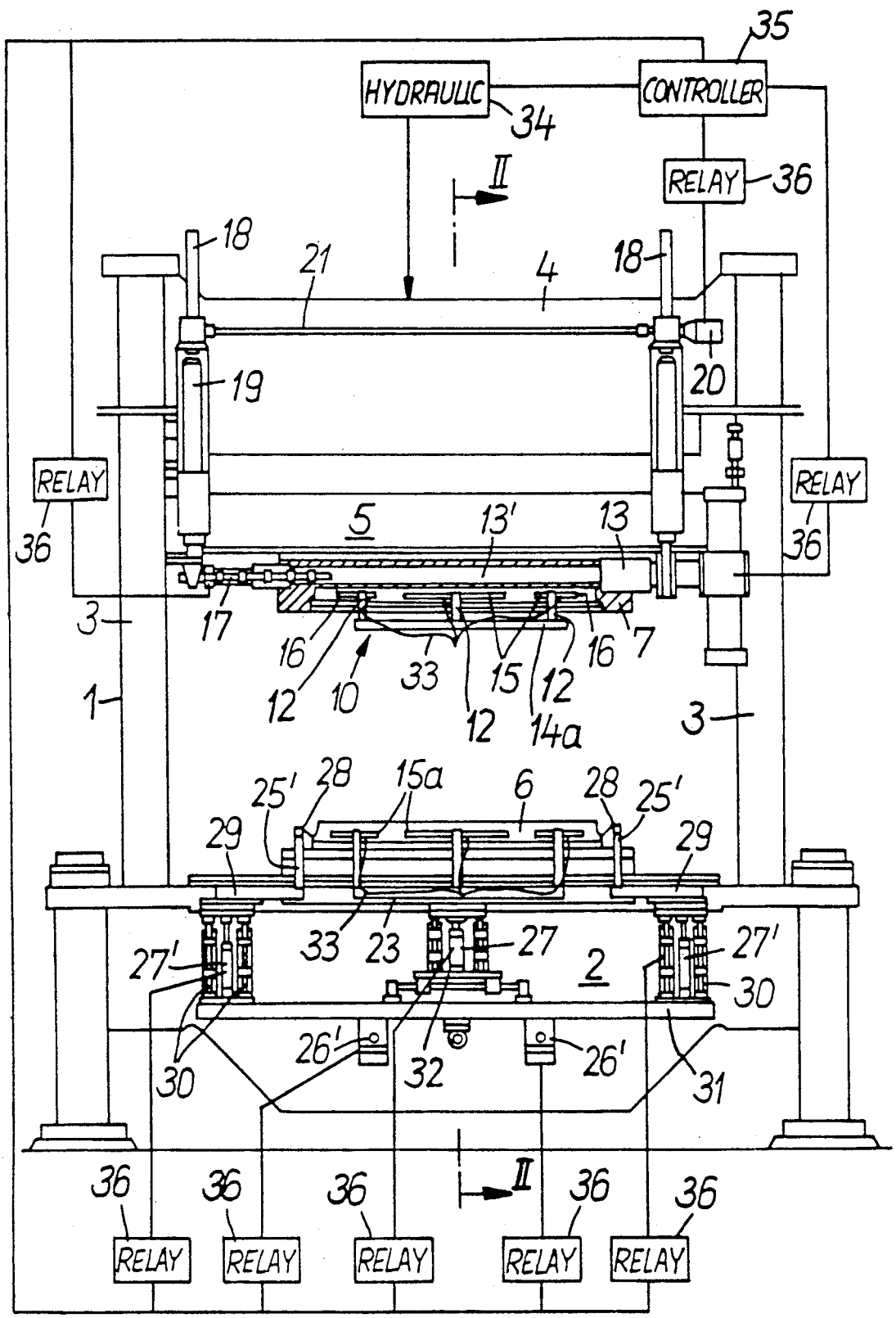
FIG. 1 is a front view of the hydraulic press.
Figure 2A:
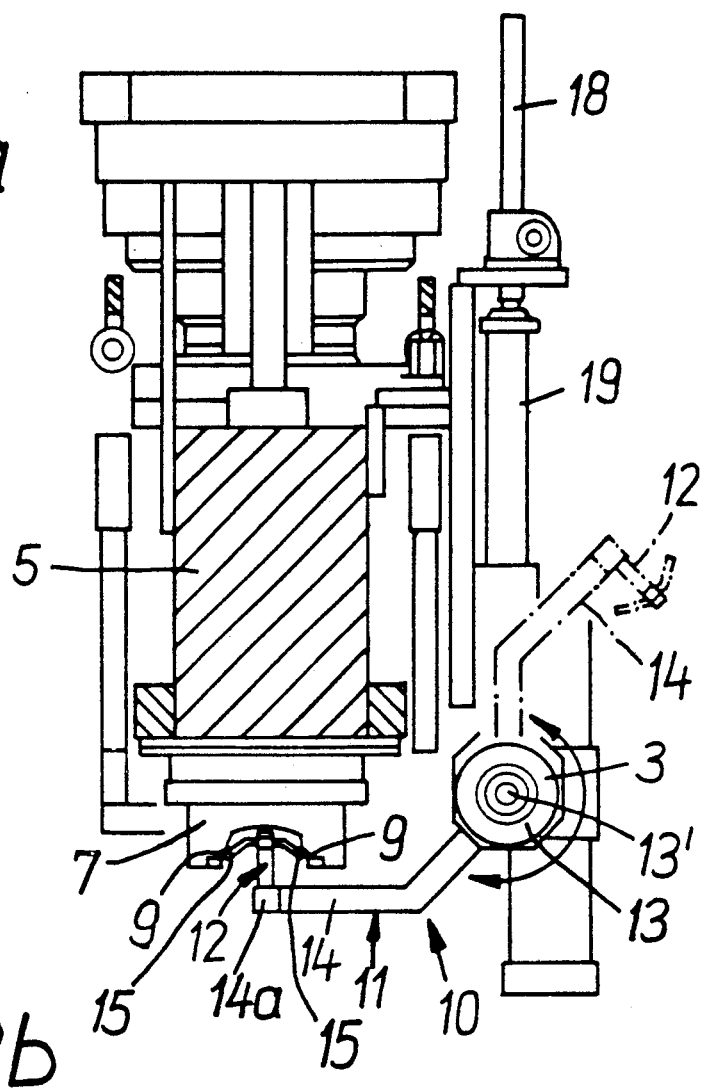
FIGS. 2a and 2b are sectional views of the movable upper press portion (FIG. 2a) and the stationary lower press portion (FIG. 2b) seen along line II—II of FIG. 1.

As shown in FIG. 1, the hydraulic press includes a frame-like stand 1 composed of a press table 2, columns 3 each arranged in the vicinity of a respective narrow frontal face of press table 2, and a stationary crosshead 4 connecting the two columns together, and at which crosshead one or a plurality of press cylinders, schematically illustrated by hydraulics 34, are arranged symmetrically in such a way that their piston rods act from above on press slide 5. Press table 2 and press slide 5 are each equipped with a molding tool component, i.e. die, namely male mold 6 and female mold 7 which respectively have working edges (hereinafter referred to as immersion edges) 8 and 9, as most clearly illustrated in FIGS. 2a and 2b.

Female mold 7 and slide 5 are associated with a cleaning device 10 whose holder 11 for a cleaning tool 12 is composed of a shaft 13' and pivot arms 14 arranged parallel to one another at the shaft. The cleaning tool 12, which is exchangeably fastened to a bar 14a connected to the free ends of pivot arms 14, include blow strips 15 which are elongated members arranged in two parallel rows and which are equipped with blow nozzles as charging elements arranged equidistantly spaced from one another in such a manner that, in the operating position shown in FIG. 2a, they act on the immersion edges 9 of female mold 7 so as to remove remainders of burrs remaining at the immersion edges after the operating stroke. Alternatively, or in addition, the charging elements of the cleaning tool may include brushes and/or scrapers. When seen in their basic outline, female mold 7 and thus its immersion edges 9 form an elongated rectangle so that correspondingly short immersion edges are formed along the short sides of this rectangle. Air nozzles 16, disposed at the ends of blow strips 15 which are adapted in length to the length of the female mold, act on these short immersion edges, the nozzles being set at an appropriate angle for this purpose.

As soon as cleaning device 10 has reached the operating position, a pneumatic setting cylinder 17 connected with shaft 13' is switched on with the aid of a controller 35 so that shaft 13' performs an oscillating movement in the direction of its axis. The stroke or, more precisely, the amplitude of this oscillation is set so that the immersion edges at the frontal faces of female mold 7 are not contacted by the associated ends of blow strips 15. When the cleaning process is completed, a pivoting motor 13 pivots pivot arms 14 back into the pivoted-out position shown in dot-dash lines in FIG. 2a.

Respective guides 19 are disposed at each of two columns 18 which are fastened vertically in the upper portion of the press so as to permit cleaning device 10 to be adjusted in height. For this purpose, a setting motor 20 is provided which connects the guides 19 with one another by means of a shaft 21.

Figure 2B:
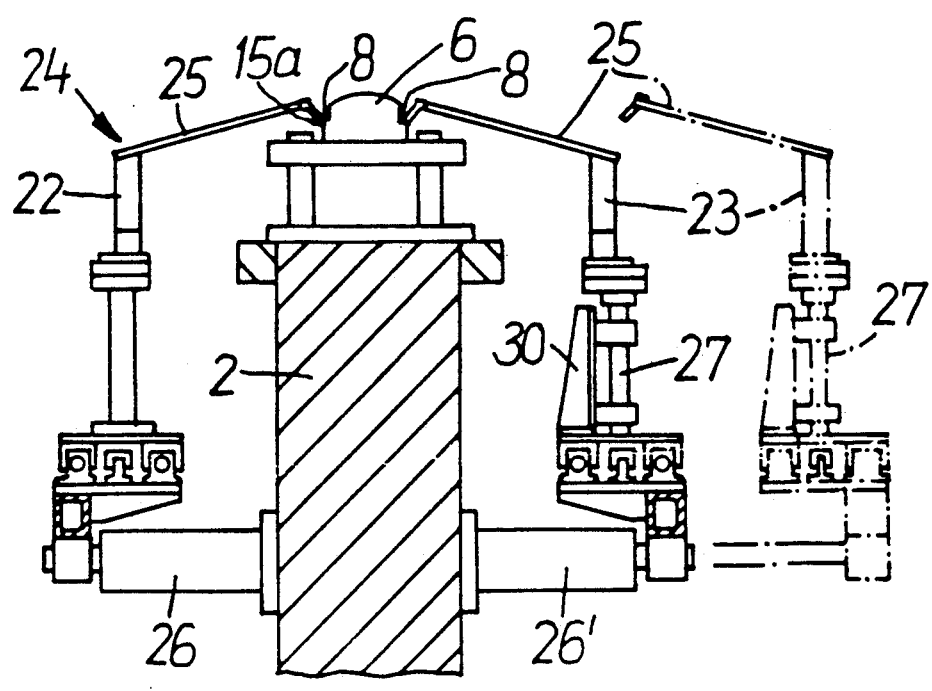

As shown in FIG. 2b, male mold 6 has an associated cleaning device 24 which is composed of two parts 22 and 23 each fastened to a long side of press table 2. In the same manner as cleaning device 10, components 22 and 23 are provided with parallel arms 25 which serve as holders for blow strips 15a disposed, in the same manner as blow strips 15, parallel to one another at the free ends of arms 25. The blow nozzles of blow strips 15a act on immersion edges 8 of male mold 6. Component 22 is movable toward the press table and away from it solely by means of a pneumatic setting cylinder 26 flanged to press table 2, while component 23 which is movable in the same manner by means of a setting cylinder 26' disposed opposite it at the press table, is able to additionally perform a vertical lifting movement with the aid of vertically arranged setting cylinders 27. This lifting movement serves the purpose of preventing a collision of the cleaning tool with an insertion device employed for the mold component. Component 23 is thus moved downwardly at the same time as it is removed from the operating position.

For cleaning of the frontal face immersion edges of male mold 6, blow strips 28 are provided which are set parallel to these immersion edges and whose blow nozzles, when in the operating position, act on these immersion edges. All blow nozzles are set at such an angle that they act on the burr roots of the immersion edges. Thus the impurities come loose more easily by way of a peeling effect. Blow strips 28 are disposed at arms 25' which are each disposed in special holders 29 on both ends next to component 23. Holders 29 are also adjustable in height by means of lifting cylinders 27'. Lifting cylinders 27' are arranged in such a manner that they lie in a vertical plane together with lifting cylinder 27. Each of the lifting cylinders 27 and 27' has two associated vertical guides 30. While one end of lifting cylinders 27' is connected with a bracket 31 which is part of component 23, lifting cylinder 27 as well as its associated guides are fastened to a carriage 32 which, by means of a pneumatic drive, again generates the oscillating movement of blow strips 15a, the latter corresponding in function to the blow strips 15 of the female mold cleaning device 10. The supply of air to the blow strips or blow nozzles is effected through flexible hoses 33 which are connected to a supply conduit (not shown).

The movements of cleaning devices 10 and 24 are controlled by the movements of press slide 5 or, more precisely, are synchronized with its movement as by a controller 35 coupled via relays 36 between the hydraulics 34, and the pneumatic cylinders 17, 26, 26', 27, 27' and motors 13 and 20. Additionally, sensors operating as distance sensors can also be employed for the control. This is applicable, in particular, if a molding tool is employed which has a complicated configuration, where adaptation of the cleaning tool to the geometry of the molding tool would be connected with considerable expenditures.

It is possible for the molding tool to be covered, at least in part, by a single blow nozzle if this is to be done in order to reduce costs an individual case. Other variations of the cleaning device are also possible for adaptation to different types and shapes of machines and molding tools.

It will be understood that the above description of the present invention is susceptible to various modifications, changes and adaptations, and the same are intended to be comprehended within the meaning and range of equivalents of the appended claims.

What is claimed is:

1. In a plastics processing machine in the form of a press having a molding tool which includes a male mold and a female mold on respective carriers which are movable in an operating stroke of the press, toward and away from each other to mold a plastic product, and a cleaning tool which is movable to the female mold for cleaning thereof, the improvement comprising a holder fastened to the carrier of the female mold, the cleaning tool comprising blow nozzles mounted to the holder, and means for moving the holder and the blow nozzles therewith toward the female mold in synchronism with movement of the male and female molds away from each other during the operating stroke of the press, the holder being pivotable about an axis extending transversely to the operating stroke of the press, the axis being located a distance from the female mold such that the blow nozzles of the cleaning tool are pivotable to an operating position in which they engage the female mold, the female mold having immersion edges, the cleaning tool including blow strips formed in combination by the blow nozzles, the blow strips extending in the same direction as the immersion edges.

2. A machine as in claim 1, wherein the female mold has immersion edges and the blow nozzles have means for blowing on remainders of burrs remaining at the immersion edges after the operating stroke.

3. A machine as in claim 1, further comprising a removal device for removing materials dislodged from the immersion edges of the female mold, disposed at a first side of the apparatus, wherein the holder is disposed at a second side of the apparatus facing away from the first side.

4. A machine as in claim 1, wherein said blow strips are movable so as to oscillate in said direction for cleaning said immersion edges.

5. A machine as in claim 1, including
a further cleaning tool which is movable to the male mold for cleaning thereof,
a further holder fastened to the carrier of the male mold, the further cleaning tool being mounted to the further holder, and
means for moving the further holder and the further cleaning tool therewith toward the male mold in synchronism with the operating stroke of the press, the further holder being displaceable transversely to the operating stroke of the press.

6. A machine as in claim 5, further comprising pneumatic setting cylinders coupled to the further holder for displacing the further holder transversely to the operating stroke of the press.

7. A machine as in claim 5, wherein the further holder includes two movable components disposed symmetrically on opposite sides of the male mold.

8. A machine as in claim 7, further comprising pneumatic setting cylinders coupled to the two movable components for displacing the two movable components transversely to the operating stroke of the press.

9. A machine as in claim 7, wherein at least one of the two movable components is additionally movable in the direction of the operating stroke.

10. A machine as in claim 9, further comprising pneumatic setting cylinders coupled to the two movable components for displacing the two movable components transversely to the operating stroke of the press and additionally displacing one of the two movable components in the direction of the operating stroke.

* * * * *